(12) United States Patent
Tenny

(10) Patent No.: US 8,891,458 B2
(45) Date of Patent: Nov. 18, 2014

(54) USER EQUIPMENT CAPABILITY UPDATE IN WIRELESS COMMUNICATIONS

(75) Inventor: Nathan Edward Tenny, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 1478 days.

(21) Appl. No.: 12/327,301

(22) Filed: Dec. 3, 2008

(65) Prior Publication Data

US 2009/0149162 A1 Jun. 11, 2009

Related U.S. Application Data

(60) Provisional application No. 60/992,645, filed on Dec. 5, 2007.

(51) Int. Cl.
*H04W 4/00* (2009.01)
*H04W 76/04* (2009.01)

(52) U.S. Cl.
CPC ................ *H04W 76/04* (2013.01)
USPC .......................... 370/329; 370/328

(58) Field of Classification Search
USPC .............. 370/252, 311, 329, 331, 328; 455/412.1, 414.1, 436
See application file for complete search history.

(56) References Cited

U.S. PATENT DOCUMENTS

| | | | |
|---|---|---|---|
| 6,101,392 A | 8/2000 | Corriveau | |
| 6,333,947 B1 | 12/2001 | van Heeswyk et al. | |
| 6,671,511 B1 | 12/2003 | Forssell et al. | |
| 6,678,517 B2 | 1/2004 | Naim et al. | |
| 6,721,562 B2 | 4/2004 | Kelley | |
| 6,892,076 B2 | 5/2005 | Maalismaa et al. | |
| 6,898,429 B1 | 5/2005 | Vialen et al. | |
| 6,909,703 B2 | 6/2005 | Terry et al. | |
| 7,099,689 B2 | 8/2006 | Bahl et al. | |
| 7,123,590 B2 | 10/2006 | Mir et al. | |
| 7,158,810 B2 | 1/2007 | Schwarz et al. | |

(Continued)

FOREIGN PATENT DOCUMENTS

| | | |
|---|---|---|
| CN | 1372736 A | 10/2002 |
| CN | 1521956 A | 8/2004 |

(Continued)

OTHER PUBLICATIONS

3GPP TS 25.306 V6.8.0 3rd Generation Partnership Project; Technical Specification Group Radio Access Network; UE Radio Access capabilities (Release 6) (Mar. 2006) pp. 1-33.

(Continued)

*Primary Examiner* — Noel Beharry
*Assistant Examiner* — Farhad Ali
(74) *Attorney, Agent, or Firm* — Ashish L. Patel

(57) ABSTRACT

Systems and methodologies are described that facilitate unsolicited indication of mobile device capability change in wireless communication networks. Upon establishing communication with an access point, a mobile device can experience a change in capability, such as by attaching a device, changing a setting in a user interface, and/or the like. Rather than waiting for a reconfiguration command, when changing base stations or switching from idle to active mode, the mobile device can transmit an unsolicited message to the access point indicating the change. The access point can support the change in subsequent uplink communications or deny such support and can accordingly notify the mobile device via radio resource control (RRC) message.

33 Claims, 11 Drawing Sheets

(56) References Cited

U.S. PATENT DOCUMENTS

| | | | |
|---|---|---|---|
| 7,177,658 B2 | 2/2007 | Willenegger et al. | |
| 7,184,792 B2 | 2/2007 | Mir | |
| 7,260,080 B2 | 8/2007 | Suumaki et al. | |
| 7,272,120 B2 | 9/2007 | Rajkotia | |
| 7,321,780 B2 | 1/2008 | Love et al. | |
| 7,340,615 B2 | 3/2008 | Krantz et al. | |
| 7,352,698 B2 | 4/2008 | Niwano et al. | |
| 7,433,334 B2 | 10/2008 | Marjelund et al. | |
| 7,647,033 B2 | 1/2010 | Uozumi et al. | |
| 7,693,543 B2 | 4/2010 | Schwarz et al. | |
| 7,804,837 B2 | 9/2010 | Maansaari et al. | |
| 7,907,560 B2 | 3/2011 | Jang et al. | |
| 7,991,387 B2 * | 8/2011 | Rowley et al. | 455/411 |
| 8,130,705 B2 | 3/2012 | Bhattacharjee et al. | |
| 8,169,973 B2 | 5/2012 | Palenius et al. | |
| 2001/0010685 A1 | 8/2001 | Aho | |
| 2001/0026538 A1 | 10/2001 | Bruss | |
| 2002/0045458 A1 | 4/2002 | Parantainen et al. | |
| 2003/0224820 A1 | 12/2003 | Einola et al. | |
| 2004/0002366 A1 | 1/2004 | Cromer et al. | |
| 2004/0047328 A1 | 3/2004 | Proctor et al. | |
| 2004/0081115 A1 | 4/2004 | Parsa et al. | |
| 2004/0198369 A1 | 10/2004 | Kwak et al. | |
| 2005/0128956 A1 | 6/2005 | Hsu et al. | |
| 2006/0019647 A1 | 1/2006 | Muhonen et al. | |
| 2006/0083191 A1 | 4/2006 | Niwano et al. | |
| 2006/0133307 A1 * | 6/2006 | Fukasawa et al. | 370/328 |
| 2006/0211425 A1 | 9/2006 | Bae et al. | |
| 2006/0229102 A1 | 10/2006 | Kitazoe et al. | |
| 2006/0262732 A1 | 11/2006 | Joutsenvirta et al. | |
| 2007/0207794 A1 | 9/2007 | Dunko | |
| 2007/0224990 A1 | 9/2007 | Edge et al. | |
| 2007/0254647 A1 | 11/2007 | Salkintzis | |
| 2008/0144582 A1 | 6/2008 | Das et al. | |
| 2008/0274739 A1 | 11/2008 | Wu | |
| 2008/0300027 A1 | 12/2008 | Dou et al. | |
| 2009/0077395 A1 | 3/2009 | Tsai | |
| 2009/0082028 A1 | 3/2009 | Hosein et al. | |
| 2009/0129339 A1 * | 5/2009 | Young et al. | 370/331 |
| 2009/0141783 A1 | 6/2009 | Kirrmann | |
| 2009/0180414 A1 | 7/2009 | Maeda et al. | |
| 2009/0196259 A1 | 8/2009 | Pani et al. | |
| 2009/0270109 A1 | 10/2009 | Wang et al. | |
| 2010/0034094 A1 | 2/2010 | Tenny | |
| 2010/0182963 A1 | 7/2010 | Fischer et al. | |
| 2010/0183051 A1 | 7/2010 | Margarit | |
| 2011/0099287 A1 | 4/2011 | Manor | |
| 2012/0195249 A1 | 8/2012 | Bhattacharjee et al. | |

FOREIGN PATENT DOCUMENTS

| | | |
|---|---|---|
| CN | 1666554 A | 9/2005 |
| CN | 1751534 A | 3/2006 |
| CN | 101233720 A | 7/2008 |
| CN | 101427479 A | 5/2009 |
| EP | 1437912 A1 | 7/2004 |
| EP | 1679914 A1 | 7/2006 |
| EP | 1750469 A1 | 2/2007 |
| JP | 2000152337 A | 5/2000 |
| JP | 2002164838 A | 6/2002 |
| JP | 2004320240 A | 11/2004 |
| JP | 2005073261 A | 3/2005 |
| JP | 2005525032 A | 8/2005 |
| JP | 2005528050 A | 9/2005 |
| JP | 2005323296 A | 11/2005 |
| JP | 2005536091 A | 11/2005 |
| JP | 2006020339 A | 1/2006 |
| JP | 2006054856 A | 2/2006 |
| JP | 2006129440 A | 5/2006 |
| JP | 2006191455 A | 7/2006 |
| JP | 2006516870 A | 7/2006 |
| JP | 2006520170 A | 8/2006 |
| JP | 2008503910 A | 2/2008 |
| JP | 2009504041 A | 1/2009 |
| JP | 2009530994 A | 8/2009 |
| JP | 2010510694 A | 4/2010 |
| KR | 20040086972 A | 10/2004 |
| KR | 20050020458 A | 3/2005 |
| KR | 100606047 | 7/2006 |
| KR | 20060104258 A | 10/2006 |
| TW | I253245 B | 4/2006 |
| TW | I259000 B | 7/2006 |
| WO | WO9963682 A2 | 12/1999 |
| WO | WO0054536 A1 | 9/2000 |
| WO | 2004004407 A1 | 1/2004 |
| WO | 2004017540 A1 | 2/2004 |
| WO | 2004082094 A2 | 9/2004 |
| WO | 2005020618 A1 | 3/2005 |
| WO | 2005079097 A1 | 8/2005 |
| WO | 2005107311 A1 | 11/2005 |
| WO | 2006010312 A1 | 2/2006 |
| WO | WO2006086497 A1 | 8/2006 |
| WO | 2007003707 A1 | 1/2007 |
| WO | 2007014630 A1 | 2/2007 |
| WO | WO2007025138 | 3/2007 |
| WO | 2007109695 | 9/2007 |
| WO | 2007144956 A1 | 12/2007 |
| WO | 2008043078 A2 | 4/2008 |

OTHER PUBLICATIONS

3GPP: "3GPP TR 25.813 v7.0.0 Jun. 2006, 3rd Generation Partnership Project; Technical E Access Network; Evolved Universal Terrestrial Radio Access (E-Utra) and Evolved Univers Network (E-UTRAN); Radio interface protocol aspects (Release 7)" 3rd Generation P1 (3GPP); Technical Report (TR), XX, XX, vol. 25,813, No. WOO, Jun. 19, 2006 (2006-C XP002426125.

Anonymous: "Extract from: 3GPP TS 25.331 V6.10.0 Jun. 2006 Technical Specification Project; Technical Specification Group Radio Access Network; Radio Resource Control (RR (Release 6), chapter 8.2.2.3 and 8.5.26" 3GPP, (Online) Jun. 2006, XP002468797 Publication Retrieved from the Internet:URL:ftp://ftp.3gpp.org/specs/archive/25_series/2: Feb. 13, 2008).

International Search Report and Written Opinion—PCT/US2008/085708—International Search Authority—European Patent Office—Jun. 5, 2009.

Nokia, DOCOMO: "Stage_2_Description of UE capability_for E-UTRAN," 3GPP TS-RAN R2-062211 (Online), Sep. 1, 2006, XP002468908 Internet Publicat Internet:URL:http://www.3gpp.org/ftp/tsg_ran/WG2_RL2/TSGR2_54/Documents/ > (retrieved.

Qualcomm Europe: "3GPP TSG-RAN WG2 meeting #55: R2-062961: Framework for UE LTE" (Online) Oct. 13, 2006, XP002468961 Internet Publication Retr URL:http://www.3gpp.org/ftp/tsg_ran/Wg2_RL2/TSGR2_55/Documents/> chapter 2.1 and 2.2.

Universal Mobile Telecommunications System (UMTS); UE Radio Access capabilities definition (3GPP TS 25.306 version 7.0.0 Release 7): ETSI TS 125 306 ETSI Standards, European Telecom,Standards Institute, Sophia-Antipo, FR, vol. 3-R2, No. V700, Mar. 2006, XP014034281, ISSN: 0000-0001.

Ericsson: "Proposed changes to the RRC protocol specifcation regarding RRC connection establishment and reestablishment procedures" 3GPP Draft; R2-99417, 3rd Generation Partnership Project (3GPP), Mobile Competence Centre ; 650, Route Des Lucioles , F-06921 Sophia-Antipolis Cedex ; France, vol. RAN WG2, No. Berlin; May 21, 1999, XP050112770 [retrieved on May 21, 1999] the whole document.

Taiwan Search Report—TW097147552—TIPO—May 29, 2012.

Panasonic, "MBMS UE capability", [online], 3GPP TSG RAN WG1 #38bis, Sep. 20, 2004, R1-041233, Retrieved from the Internet URL: http://www.3gpp.org/ftp/tsg_ran/WG1_RL1/TSGR1_38bis/Docs/R1-041233.zip, (2011-10051-162).

Universal Serial Bus Usage Tables for HID Power Devices, Nov. 1, 1997, pp. 1-66, XP55081132, Retrieved from the Internet: URL : http://www.usb.org/developers/devclass_docs/pdcv10.pdf.

* cited by examiner

USER EQUIPMENT CAPABILITY UPDATE IN WIRELESS COMMUNICATIONS

CROSS-REFERENCE TO RELATED APPLICATIONS

This application claims the benefit of U.S. Provisional Patent application Ser. No. 60/992,645 entitled "METHODS AND APPARATUSES FOR UPDATING USER EQUIPMENT CAPABILITY IN A WIRELESS COMMUNICATION SYSTEM" which was filed Dec. 5, 2007. The entirety of the aforementioned application is herein incorporated by reference.

BACKGROUND

I. Field

The following description relates generally to wireless communications, and more particularly to updating user equipment capabilities in wireless communication networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. Mobile devices can initially establish communications with the wireless network via the base stations; accordingly, the mobile device can transmit capabilities to the base station for further utilization by the base station or underlying network. The capabilities can relate to data throughput, technological functionalities, compatible protocols, applications, and/or the like. Using the capabilities, the base stations and/or underlying network can more effectively communicate with the mobile devices. However, capabilities of the mobile devices can change over time and can change before, during, or subsequent communication establishment with the base stations and/or underlying network.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating notification of mobile device capability modification. For example, capabilities of a mobile device can change over time, such as to support simultaneous services, internal resource conflicts, attachment of external devices, and/or the like. Upon such changes occurring, the mobile device can notify a related access point or an underlying communications network of the configuration change using a newly defined or preexisting system message. The access point (alone or on behalf of the underlying network, for instance) can accept and implement new settings, and/or interrogate the mobile device for new settings if such were not received in the notification. Thus, the mobile device can change communication capabilities without requiring reconnection to the access point and/or underlying network.

According to related aspects, a method for updating mobile device capabilities in wireless communication networks is provided. The method comprises determining a change in capability of a wireless device and transmitting an unsolicited radio resource control (RRC) message indicating the change in capability. The method additionally comprises receiving an RRC capability response message indicating acceptance or denial of the change in capability.

Another aspect relates to a wireless communications apparatus. The wireless communications apparatus can include at least one processor configured to receive indication of capability change in the wireless communications apparatus and generate an RRC message indicating the capability change. The at least one processor is further configured to transmit the RRC message without solicitation to an access point providing wireless network access to the wireless communications apparatus. The wireless communications apparatus can also include a memory coupled to the at least one processor.

Yet another aspect relates to a wireless communications apparatus that facilitates unsolicited mobile device capability change notification in wireless communications networks. The wireless communications apparatus can comprise means for detecting a capability change in the wireless communications apparatus and means for creating an unsolicited RRC message related to the capability change. The wireless communications apparatus can additionally include means for transmitting the unsolicited RRC message to a disparate device to request support for the capability change.

Still another aspect relates to a computer program product, which can have a computer-readable medium including code for causing at least one computer to determine a change in capability of a wireless device. The computer-readable medium can also comprise code for causing the at least one computer to transmit an unsolicited RRC message indicating the change in capability. Moreover, the computer-readable medium can comprise code for causing the at least one computer to receive an RRC capability response message indicating acceptance or denial of the change in capability.

According to a further aspect, a method for reconfiguring wireless uplink communication parameters based on changed wireless device capabilities is provided. The method can include receiving an RRC message from a mobile device indicating change in one or more capabilities and determining the one or more capabilities for which change is requested. The method can further include transmitting an RRC capability response message to the mobile device indicating denial or acceptance of the change.

Another aspect relates to a wireless communications apparatus. The wireless communications apparatus can include at least one processor configured to receive unsolicited indication of capability change for a mobile device in communication with the wireless communications apparatus and determine the changed capability from the indication. The at least one processor is further configured to transmit an RRC capability response message to the mobile device accepting or denying the changed capability. The wireless communications apparatus can also include a memory coupled to the at least one processor.

Yet another aspect relates to a wireless communications apparatus for accommodating mobile device capability change in wireless communication networks. The wireless communications apparatus can comprise means for receiving an unsolicited indication of mobile device capability change as well as means for determining the changed capability of the mobile device. The wireless communications apparatus can additionally include means for transmitting an RRC capability response message comprising an indication of acceptance or denial for supporting the changed capability.

Still another aspect relates to a computer program product, which can have a computer-readable medium including code for causing at least one computer to receive an RRC message from a mobile device indicating change in one or more capabilities. The computer-readable medium can also comprise code for causing the at least one computer to determine the one or more capabilities for which change is requested. Moreover, the computer-readable medium can comprise code for causing the at least one computer to transmit an RRC capability response message to the mobile device indicating denial or acceptance of the change.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
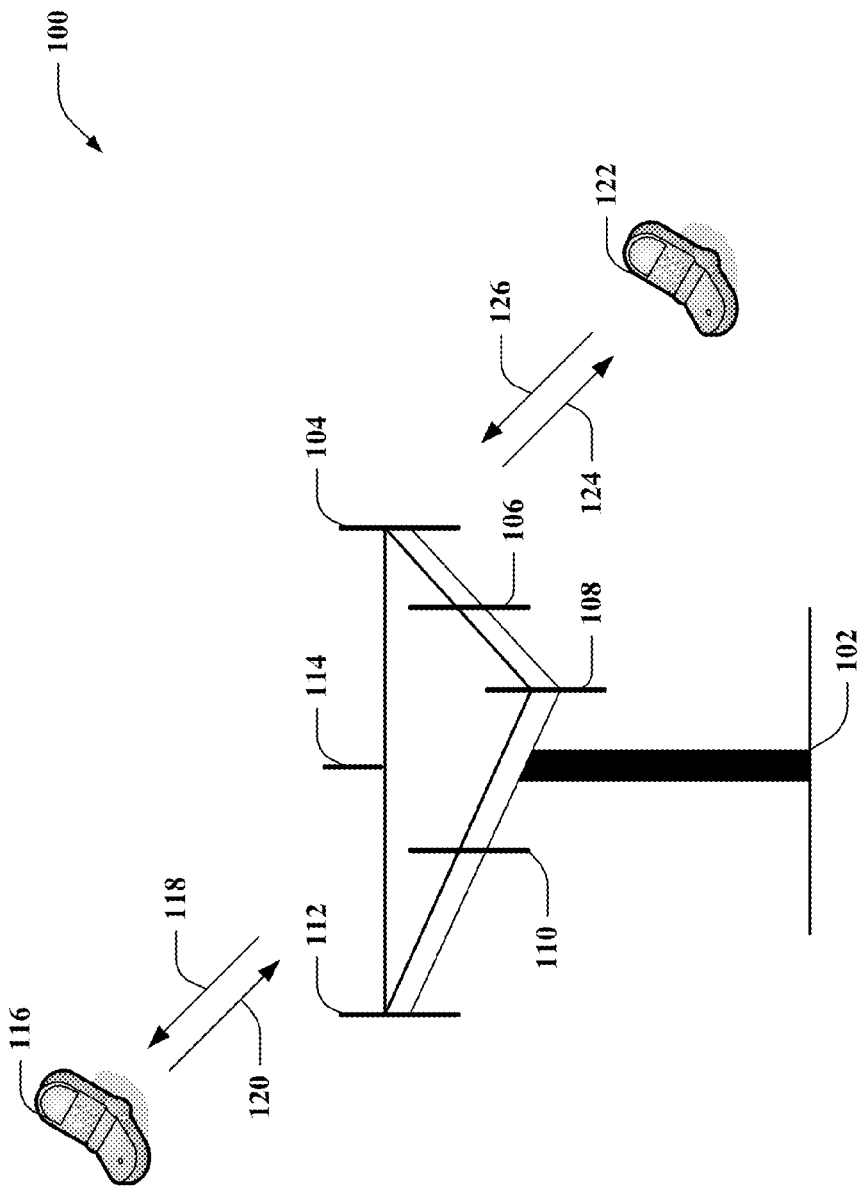
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. In one example, the mobile devices 116/122 can transmit functional capabilities to the base station 102 upon initial connection to the base station 102 and/or an underlying network (not shown). In another example, the mobile device 116/122 can additionally transmit capabilities to the base station 102 when moving from an idle state to an active state (in 3GPP LTE, for example). The base station 102 can utilize the capabilities to determine communications parameters for the mobile devices 116/122 on the uplink; moreover, the base station 102 can communicate the capabilities to an underlying wireless network node, which can utilize the capabilities to similarly determine communication parameters. The parameters can be transmitted to the mobile devices 116/122 upon determination to define subsequent supported communication functionalities on the uplink.

According to an example, the mobile devices 116/122 can change capabilities over time. Changes can result, for example, from modifications made in a user interface (UI) of the mobile device 116/122, simultaneous service establishment, internal resource conflict in the mobile device 116/122, attachment of external devices, such as global positioning system (GPS) modules/power sources, and/or the like. Upon capability change occurrence, the mobile devices 116/122 can notify the base station 102/network of the change by transmitting an unsolicited message (e.g., without prompt from the base station 102 or another device) to the base station 102. The notification can be piggybacked to an existing message or transmitted in its own message. In a 3GPP LTE context, for example, the message can be transmitted as part of a radio resource control (RRC) connection re-establishment request, which is a message transmitted over an RRC communication layer to re-establish connection with the underlying wireless network, or component thereof. This message can be transmitted even though no actual re-establishment is desired.

In one example, the base station 102 can receive the message and can transmit a reconfigure message (such as an RRC connection reconfiguration message) to the mobile device 116/122. The reconfiguration message can specify communication parameters configured by the base station 102 (alone or on behalf of the underlying network, for instance) for subsequent uplink communication by the mobile device 116/122. Additionally or alternatively, a flag indicating acceptance or denial of the re-establishment can be transmitted external to, or as part of, the reconfiguration message. In this regard, the mobile devices 116/122 can indicate capability change to the base station 102 or one or more underlying wireless network components by utilizing existing or new messages to notify of such changes upon occurrence.

Figure 2:
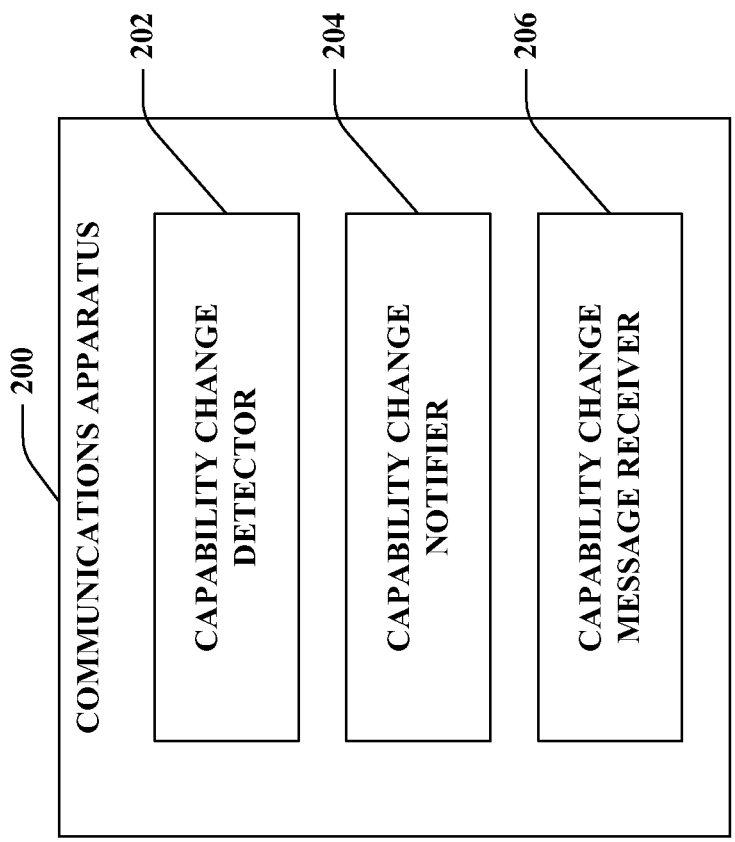
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a capability change detector 202 that determines when changes are made to capabilities of the communications apparatus 200, a capability change notifier 204 that can inform one or more disparate apparatuses of the change or existence thereof, and a capability change message receiver 206 that can receive a message indicating acceptance or denial of the new capability.

According to an example, the communications apparatus 200 can establish communication with a disparate communications apparatus (not shown) for wireless access, transmitting a set of capabilities of the communications apparatus 200. The communications apparatus 200 can undergo a change in functional capability. This can result from a variety of events, such as attachment or detachment of an external device, such as a GPS or similar receiver, a change using a UI (not shown) of the apparatus (e.g., global system for mobile communication (GSM) mode enable/disable), an automated change based at least in part on one or more communications apparatus 200 operational details (e.g., a resource conflict), and/or the like. Rather than waiting for a connection detachment/reattachment (e.g., switching from an idle to active mode in a 3GPP LTE context, or moving between access points in other contexts), the communications apparatus 200 can notify other devices (e.g., the disparate communications apparatus) of the change as it occurs.

In this example, the capability change detector 202 can detect the change in capability, such as by detecting addition of an external component, receiving notification of UI change, and/or the like. Once detected, the capability change notifier 204 can notify other apparatuses of the change; this can be a message including information regarding the added capability, a message notifying to interrogate communications apparatus 200 for the change, and/or the like. The message utilized can be an independent RRC message and/or piggybacked to an existing system RRC procedure or message thereof. In one example, the communications apparatus 200 operates in a 3GPP LTE environment and can utilize a new message or, for example, an RRC CONNECTION RE-ESTABLISHMENT REQUEST, which is an existing procedure in 3GPP LTE utilized to re-establish RRC layer communication. Though this procedure is typically utilized when a device switches from idle to active mode, the capability change notifier 204 can utilize the procedure to indicate a capability change (e.g., by specifying the parameters changed or notifying to interrogate for changes).

Where the capability change does not affect a current uplink configuration of the communications apparatus 200, the capability change message receiver 206 can receive a message indicating an acceptance or denial of the change. This can occur, for example, where a capability not requested or being utilized is added or deleted, for example. Where the capability change does affect a current uplink configuration, the capability change message receiver 206 can receive a reconfiguration message for the communications apparatus 200 to utilize based on the notified capability change (and/or capabilities of the disparate communications apparatus with related to the notified change). This message can also comprise an acceptance and/or denial of the capability change. In one example, the reconfiguration message received in either case can be an RRC CONNECTION RECONFIGURATION message, which is an existing message transmitted upon RRC connection re-establishment to specify communication configuration for the communications apparatus 200 based on the capability change. If no reconfiguration is required (e.g., in the former case), the message can simply be a dummy message with no additional configuration changes.

Figure 3:
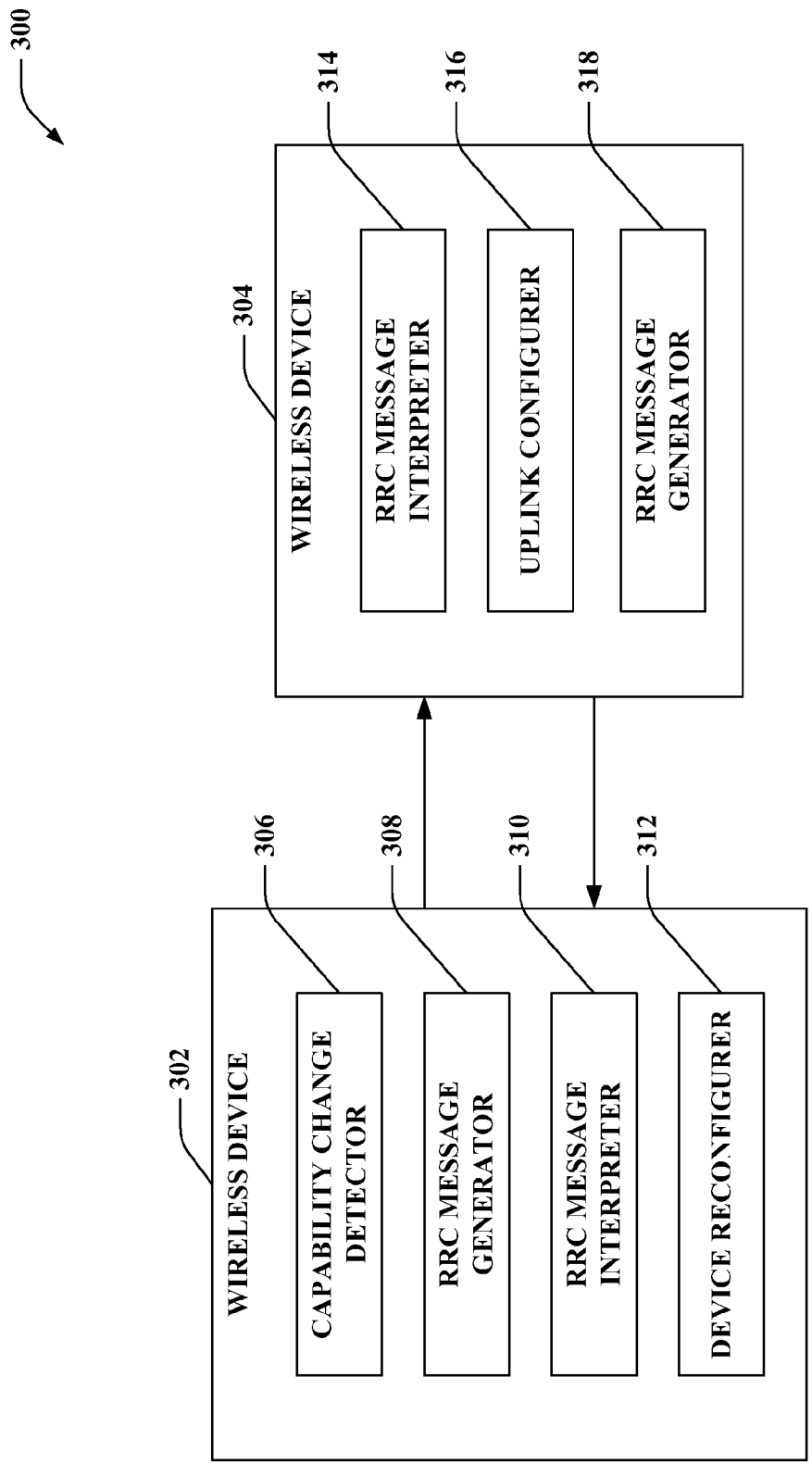
FIG. 3 is an illustration of an example wireless communications system that effectuates unsolicited wireless device capability change in active communication.

Now referring to FIG. 3, illustrated is a wireless communications system 300 that can allow capability change specification during active mode communications. Each wireless device 302 and 304 can be a base station, mobile device, or portion thereof. In one example, wireless device 302 can transmit information to wireless device 304 over a reverse link or uplink channel; further wireless device 302 can receive information from wireless device 304 over a forward link or downlink channel. Moreover, system 300 can be a MIMO system, and the wireless devices 302 and 304 can communicate at least at an RRC layer. Also, the components and functionalities shown and described below in the wireless device 302 can be present in the wireless device 304 as well and vice versa, in one example; the configuration depicted excludes these components for ease of explanation.

Wireless device 302 includes a capability change detector 306 that can detect change in functional capabilities of the wireless device 302, an RRC message generator 308 that can generate an unsolicited RRC message to notify wireless device 304 of the change, an RRC message interpreter 310 that can analyze an RRC message received in response to the capability change notification, and a device reconfigurer 312 that can reconfigure the wireless device 302 according to the received RRC message. Wireless device 304 can include an RRC message interpreter 314 that analyzes an RRC message indicating capability change of wireless device 302, an uplink configurer 316 that sets uplink parameters according to the change notification, and an RRC message generator 318 that creates an RRC capability response message for transmitting to the wireless device 302 to indicate whether the capability change was accepted and/or the extent of acceptance, for example.

According to an example, wireless device 302 can establish communications with the wireless device 304 to attain wireless network service access. In this regard, wireless device 304 can be coupled to a wireless network (not shown), such as via backhaul link, to provide access thereto. In this regard, the wireless device 302 can indicate a set of capabilities and/or related parameters in requesting communication establishment with the wireless device 304. In one example, the parameters can be specified in an RRC message prepared by the RRC message generator 308, which can be transmitted to the wireless device 304. The RRC message interpreter 314 can analyze the message to determine capabilities and/or related parameters in the message. The wireless device 304 can accordingly establish service with the wireless network for the wireless device 302 based on the capabilities thereof, and the RRC message generator 318 can generate an RRC capability response message, which is transmitted to the wireless device 302 indicating acceptance of the capability change and/or resulting uplink functionalities/parameters. In a 3GPP LTE context, this procedure can occur each time the wireless device 302 moves from idle mode to active mode, for example.

While in communication with the wireless device 304, however, the wireless device 302 can incur a change in capability. Instead of waiting for the next connection establishment to transmit the new or deleted capability to the wireless device 304 (or subsequent wireless device), the wireless device 302 can notify the wireless device 304 of the change at substantially any time between occurrence and a subsequent connection establishment. In this regard, the capability change detector 306 can detect the change, which as described can result from various factors or events, and the RRC message generator 308 can create an RRC message to notify the wireless device 304 of the change. It is to be appreciated, as described, that the message can be a new message and/or an existing, such as an RRC CONNECTION RE-ESTABLISHMENT REQUEST message or procedure—this message/procedure can be used though there may not be an actual request for connection re-establishment, in one example. The message can be transmitted to the wireless device 304 for capability change notification.

Upon receiving the message, the RRC message interpreter 314 of the wireless device 304 can determine a message type as being indicative of capability modification for wireless device 302. The uplink configurer 316 can evaluate the capability change in the message to determine whether uplink communications parameters should be modified—this can be additionally based on capabilities of the wireless device 304 and/or the underlying wireless network. In one example, the capability change can relate to an event not necessarily affecting the allocated uplink resources, such as a change in mode not being utilized (e.g., GSM-mode disable when communicating with a non-GSM wireless device 304 or other addition of non-supported functionality, such as GPS). In this case, the RRC message generator 318 can create an RRC capability response message, which can be a dummy RRC CONNECTION RECONFIGURATION command, a newly defined RRC message, or piggyback a disparate existing message or command. The message can provide indication as to whether the capability change is accepted or denied. In the case of an existing message, this can be added as a flag, for example. In this regard, however, no re-configuration is required to be transmitted since the capability did not apply to the current uplink settings.

In another example, the capability change can relate to an event that does affect the current uplink configuration. In this example, the uplink configurer 316 can determine uplink parameters to be added and/or deleted from the current configuration. For example, if the capability change relates to modification of uplink data rate, the uplink configurer 316 can accordingly modify parameters of the uplink to accommodate the requested data rate, if possible. Once determined, the RRC message generator 318 can create an RRC capability response message, such as an RRC CONNECTION RECONFIGURATION command in 3GPP LTE, additionally comprising the new configuration parameters. Again, the message can have a capability accept/deny flag to indicate whether the wireless device 304 has accommodated the change. The message can be transmitted to the wireless device 302 where the RRC message interpreter 310 can determine the message contents. Based on the comprised uplink reconfiguration parameters, the device reconfigurer 312 can accordingly reset parameters for the wireless device 302 to coincide with those received. For example, if the message indicates the capability change was accepted, the device reconfigurer 312 can implement parameter changes for subsequent communications over the uplink, whereas if the capability change was denied, the wireless device 302 can continue communicating with wireless device 304 without parameter reconfiguration.

According to an example, if the capability change is not accepted by the wireless device 304 (e.g., the RRC capability response message has a false accept flag), the wireless device 302 can react in a variety of ways. For example, the wireless device 302 can retry the request at will (e.g., according to its own scheme). In another example, the wireless device 302 can have a mandated delay period, which can be hard-coded in the wireless device 302 or specified as a network system parameter. In yet another example, such a mandated time can be specified in the RRC capability response message (e.g., the RRC CONNECTION RECONFIGURATION command) allowing the wireless device 304 to decide when the wireless device 302 can re-request the capability change. This can be helpful, for example, where new wireless devices 302 are rolled out with new functionality, which can specify capability change to accommodate the functionality all at one time.

Moreover, in one example, the RRC messages passed between the wireless device 302 and wireless device 304 can comprise transaction identifiers to appropriately relate a capability change request to a response message. For example, the wireless device 302, upon detecting capability change, can specify a transaction identifier in the RRC message created by the RRC message generator 308. Upon receiving the RRC message, the RRC message interpreter 314 can record the identifier, which the RRC message generator 318 can subsequently utilize in generating its RRC capability response message. Upon receiving the message, the device reconfigurer 312 can verify the transaction identifier to ensure that it relates to a proper RRC message requesting capability change. In this regard, if allowed by the wireless device 304 and/or underlying network for example, the wireless device 302 can request another capability change before receiving a response related to the first capability change. In addition, it can be possible that the wireless device 302 receives an actual reconfiguration request (e.g., an actual RRC CONNECTION RECONFIGURATION as the result of switching from idle to active mode in 3GPP LTE) before receiving an RRC capability response message that can also use the RRC CONNECTION RECONFIGURATION command syntax. Thus, the transaction identifier can allow the wireless device 302 to differentiate between such messages. It is to be appreciated, in this regard, that a 1-bit degenerate identifier can be utilized (as well as the accept/deny flag, for example) to differentiate between the messages.

Figure 4:
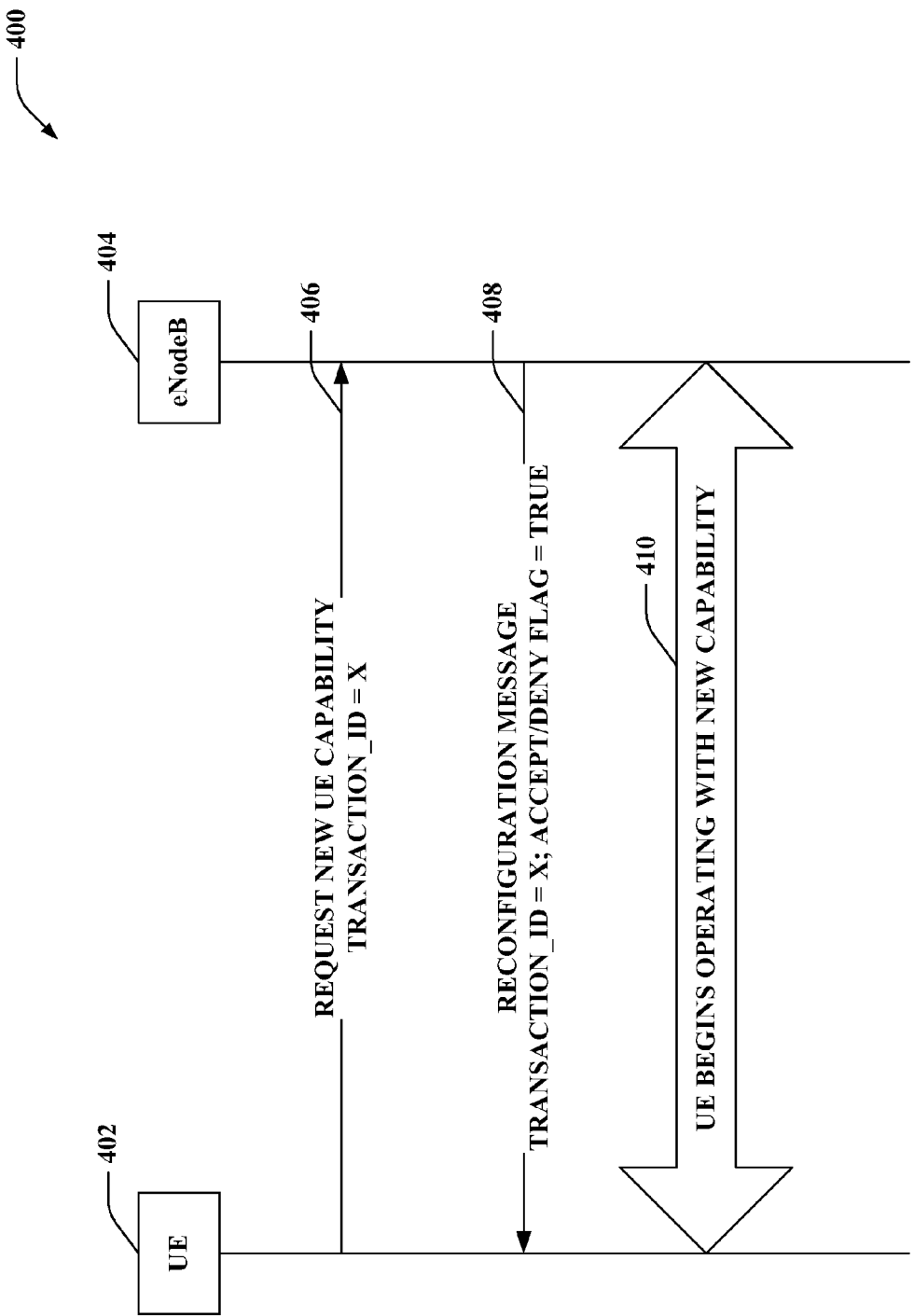
FIG. 4 is an illustration of an example wireless communication system for utilizing unsolicited change notifications to modify uplink parameters.

Turning now to FIG. 4, illustrated is an example wireless communications network 400 that facilitates unsolicited notification of UE capability change. A UE 402 is provided that is communicating with an eNodeB 404 to receive wireless access services. In one example, the eNodeB 404 can provide 3GPP LTE service access to the UE 402. The UE 402, for example, can have transmitted a set of capabilities to the eNodeB 404 upon establishing communications and/or in an RRC CONNECTION RE-ESTABLISHMENT REQUEST switching from an idle to an active communication mode (e.g., in a 3GPP LTE context). According to an example, the UE 402 can experience a capability change, as described herein. At 406, the UE 402 can request support for the new capability from the eNodeB 404 and can transmit a transaction identifier, X, with the request. In one example, the request can be transmitted in a new or existing message, such as an RRC CONNECTION RE-ESTABLISHMENT REQUEST message.

Upon receiving the message, the eNodeB 404 can determine the requested capability support and can generate a response message. As described, the response message can be based at least in part on whether the eNodeB 404 accepts the capability, which can be determined by eNodeB 404 and/or underlying network capabilities. The response message can comprise the transaction identifier, X, from the request message 402 as well as an indicator as to whether the capability change was accepted or denied. In addition, where the capability change affects current configuration, as described previously, the response message can be a reconfiguration message comprising new uplink parameters. At 408, the reconfiguration message is transmitted to the UE 402 from the eNodeB 404. As described, this can be a new or existing message, such as a RCC CONNECTION RECONFIGURE command in 3GPP LTE. If the accept/deny flag in the reconfiguration message is true and the transaction identifiers match, then at 410, the UE begins operating using the new capability if applicable. In this regard, unsolicited notification of UE capability change is achieved.

Figure 5:
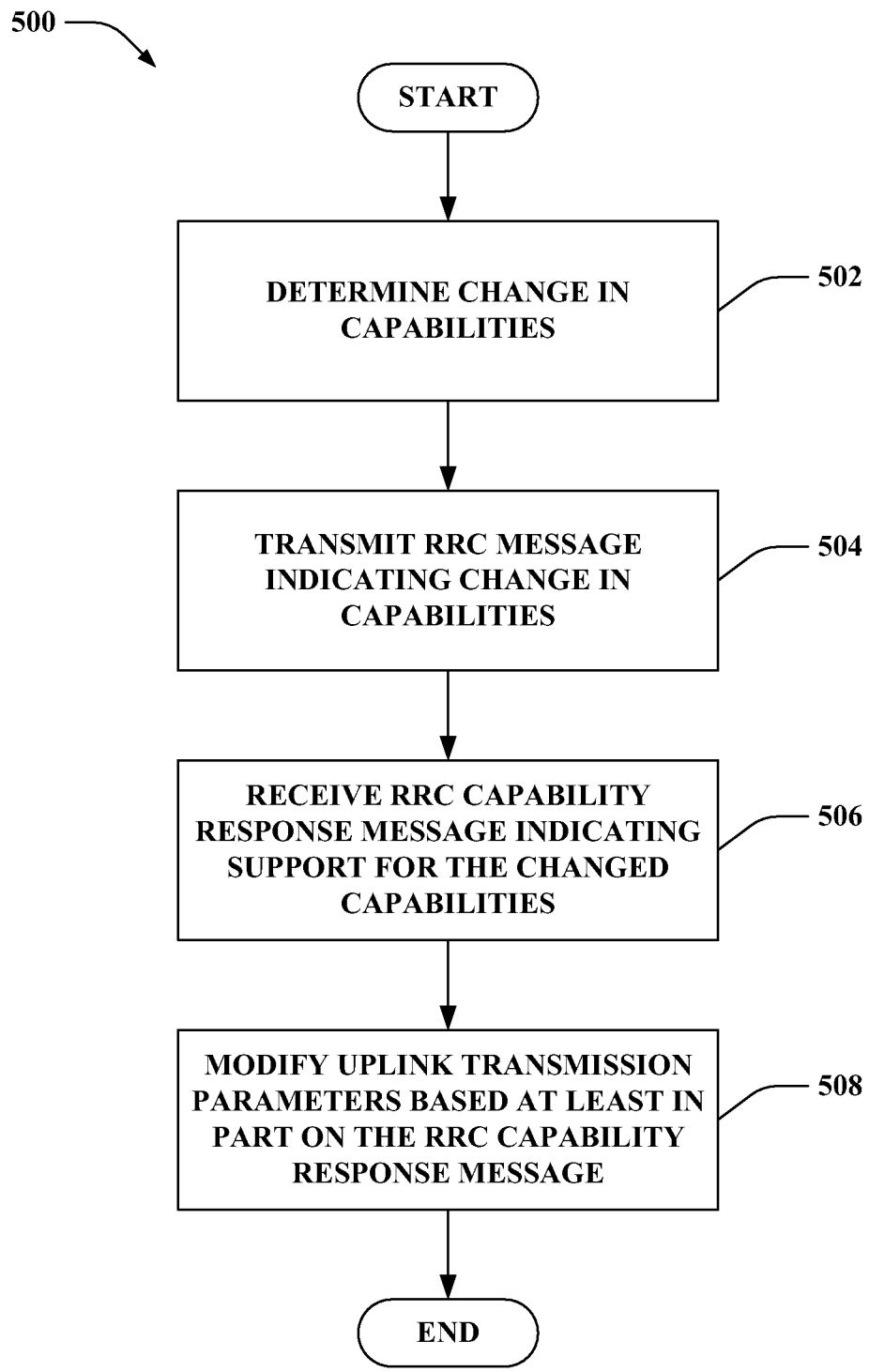
FIG. 5 is an illustration of an example methodology that facilitates transmitting an unsolicited capability change notification.
Figure 6:
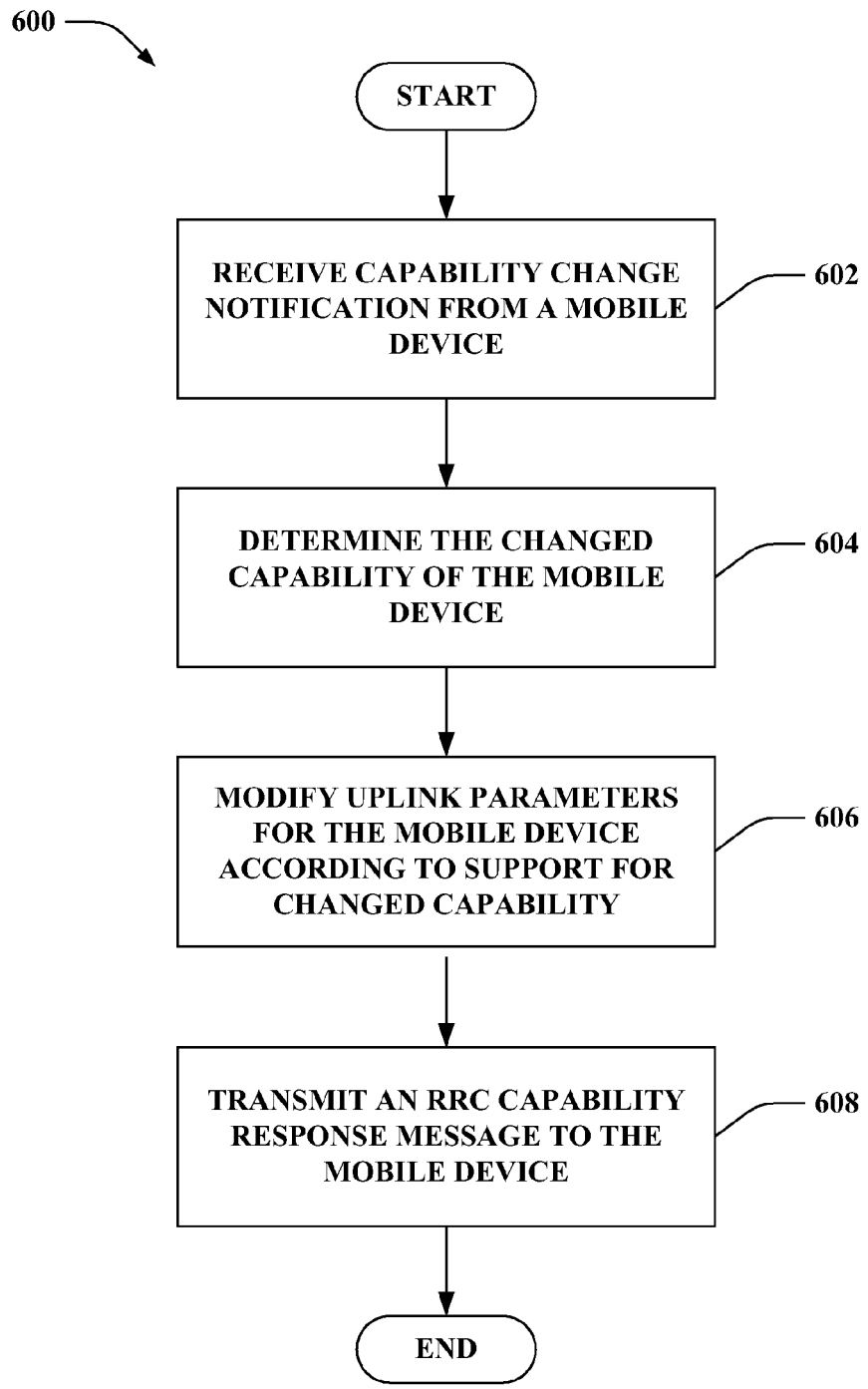
FIG. 6 is an illustration of an example methodology that facilitates receiving an unsolicited capability change notification.

Referring to FIGS. 5-6, methodologies relating to unsolicited indication of mobile device capability change are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates transmitting unsolicited capability change notification in wireless communications is displayed. At 502, a change in capabilities is determined. For example, as described, this can result from attachment/detachment of external hardware, modified UI setting, and/or the like. At 504, an RRC message can be transmitted indicating the change in capabilities. Thus, a device receiving the message can decide to accommodate or not accommodate the change. In addition, the message can be a new message and/or an existing system message, such as an RRC connection establishment/re-establishment message (e.g., RRC CONNECTION RE-ESTABLISHMENT REQUEST in a 3GPP LTE context). At 506, an RRC capability response message can be received indicating support for the changed capabilities. The support indication, for example, can be true or false (and/or partial support in one example). In addition, the RRC capability response message can indicate reconfigured uplink parameters for supporting the changed capabilities. At 508, the uplink transmission parameters can be accordingly modified based at least in part on the RRC capability response message.

Turning to FIG. 6, illustrated is a methodology 600 that receives unsolicited mobile device capability change notification. At 602, a capability change notification is received from a mobile device. For example, as described, this can result from capabilities added or deleted from a mobile device (e.g., attachment/detachment of an external device, change in UI, and/or the like). At 604, the changed capability of the mobile device can be determined from the notification. For instance, this determination can aid in deciding if all or a portion of the capability change can be supported. At 606, uplink parameters can be modified for the mobile device according to support for the changed capability. Thus, if the change can be supported, parameters for the uplink communication channel can be accordingly modified. At 608, an RRC capability response message can be transmitted to the mobile device; this message can comprise indication of acceptance or denial of support for the capability change, for example. In addition, the message can comprise a transaction identifier and/or a re-request timer, as described previously.

It will be appreciated that, in accordance with one or more aspects described herein, inferences can be made regarding determining support for a capability change (and/or uplink parameter modification) as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. In one example, inferences can additionally be made in determining a wait timer latency for re-transmitting a denied request.

Figure 7:
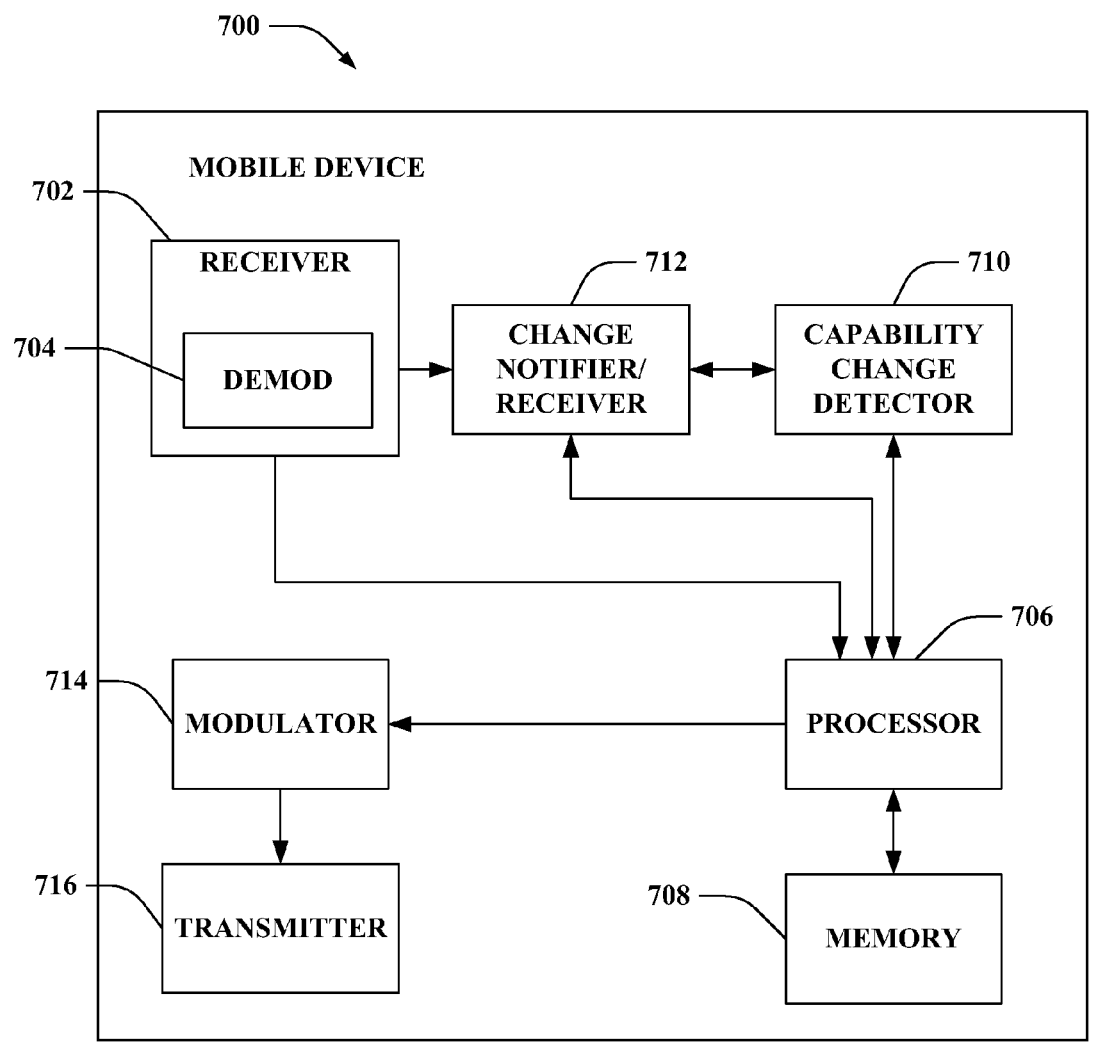
FIG. 7 is an illustration of an example mobile device that facilitates notifying a disparate device of a change in capability.

FIG. 7 is an illustration of a mobile device 700 that facilitates unsolicited notification of changes in capability. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a capability change detector 710 that can determine a change in capability of the mobile device 700. For example, as described, the change can result from a variety of external and/or internal influences or modifications. The processor 706 and/or receiver 702, can be further operatively coupled to a change notifier/receiver 712, which can generate a message for notification of the change. The message can be unsolicited, as described, and transmitted to one or more devices providing network access to the mobile device, for example. The message can be a new or existing RRC layer message as described. Once the message is sent, the change notifier/receiver 712 can receive a response message from the one or more devices providing network access; the response can indicate acceptance or denial of support for the capability change. Where the change is accepted, for example, the message can further comprise reconfiguration parameters for the uplink based on support for the capability change. The processor 706 can effectuate changes according to the parameters for subsequent uplink communication. In addition, the message can comprise a transaction identifier or timer, as described, to respectively match the message with the message transmitted by the mobile device 700 or set a time for re-transmission of the message if support for the change was denied. Mobile device 700 still further comprises a modulator 714 and transmitter 716 that respectively modulate and transmit signals to, for instance, a base station, another mobile device, etc. Although depicted as being separate from the processor 706, it is to be appreciated that the capability change detector 710, change notifier/receiver 712, demodulator 704, and/or modulator 714 can be part of the processor 706 or multiple processors (not shown).

Figure 8:
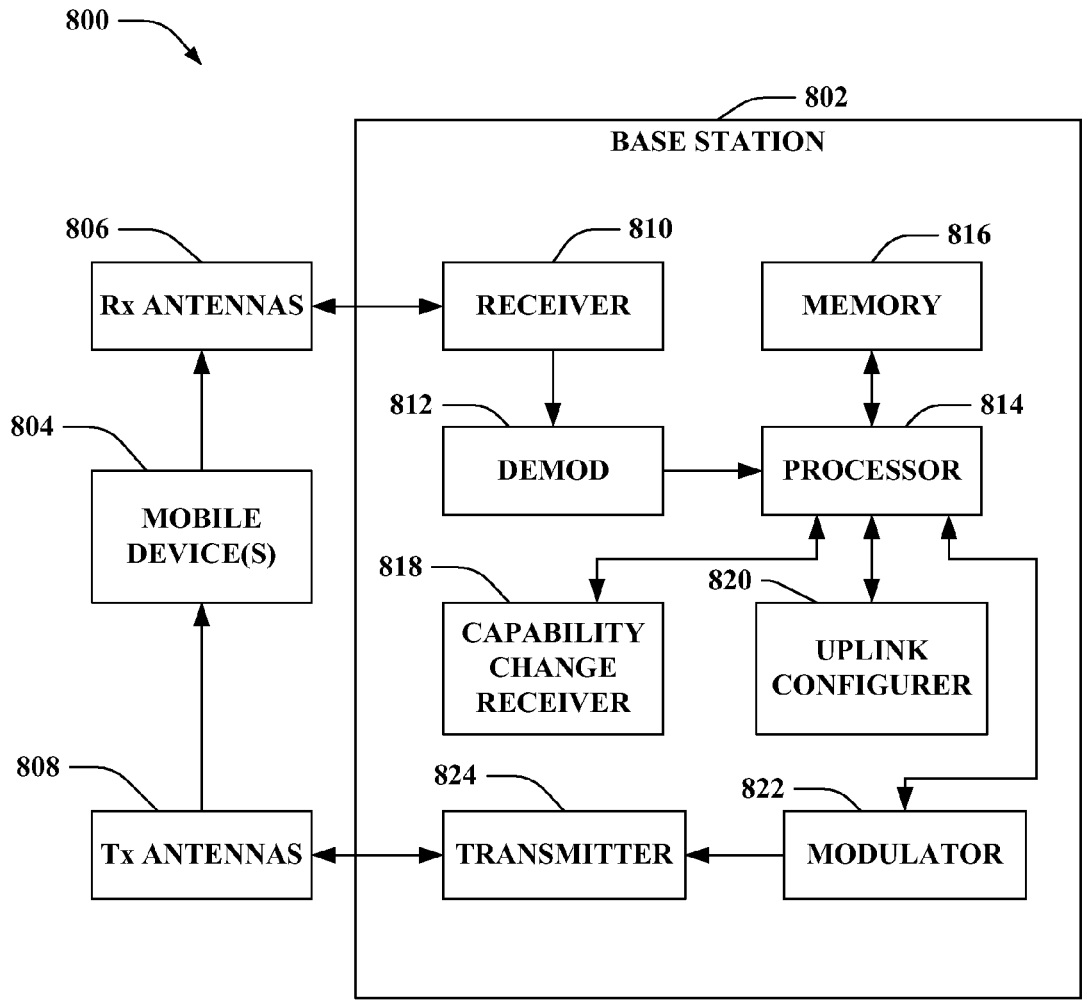
FIG. 8 is an illustration of an example system that responds to an unsolicited change in capability from a mobile device.

FIG. 8 is an illustration of a system 800 that facilitates receiving unsolicited capability change notification for one or more wireless devices. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a capability change receiver 818 that can receive unsolicited notification of a change in capability of the mobile device(s) 804 and an uplink configurer 820 that can reconfigure uplink parameters based on the capability change.

According to an example, the capability change receiver 818 can obtain an indication of capability change of one or more mobile device(s) 804. This can result from receiving an unsolicited message via receiver 810, for example. The capability change receiver 818 can determine the changed capabilities for which support is requested and determine whether support should be granted based at least in part on capabilities of the base station 802 and/or the underlying wireless network. If support is granted and such requires modification to current uplink parameters, the uplink configurer 820 can make appropriate modifications. Information regarding granting of support and/or uplink parameter modifications can be transmitted to the mobile device(s) 804 to allow utilization of modified parameters in subsequent communication. In this regard, unsolicited notification and accommodation of mobile device capability change is effectuated. Furthermore, although depicted as being separate from the processor 814, it is to be appreciated that the capability change receiver 818, uplink configurer 820, demodulator 812, and/or modulator 822 can be part of the processor 814 or multiple processors (not shown).

Figure 9:
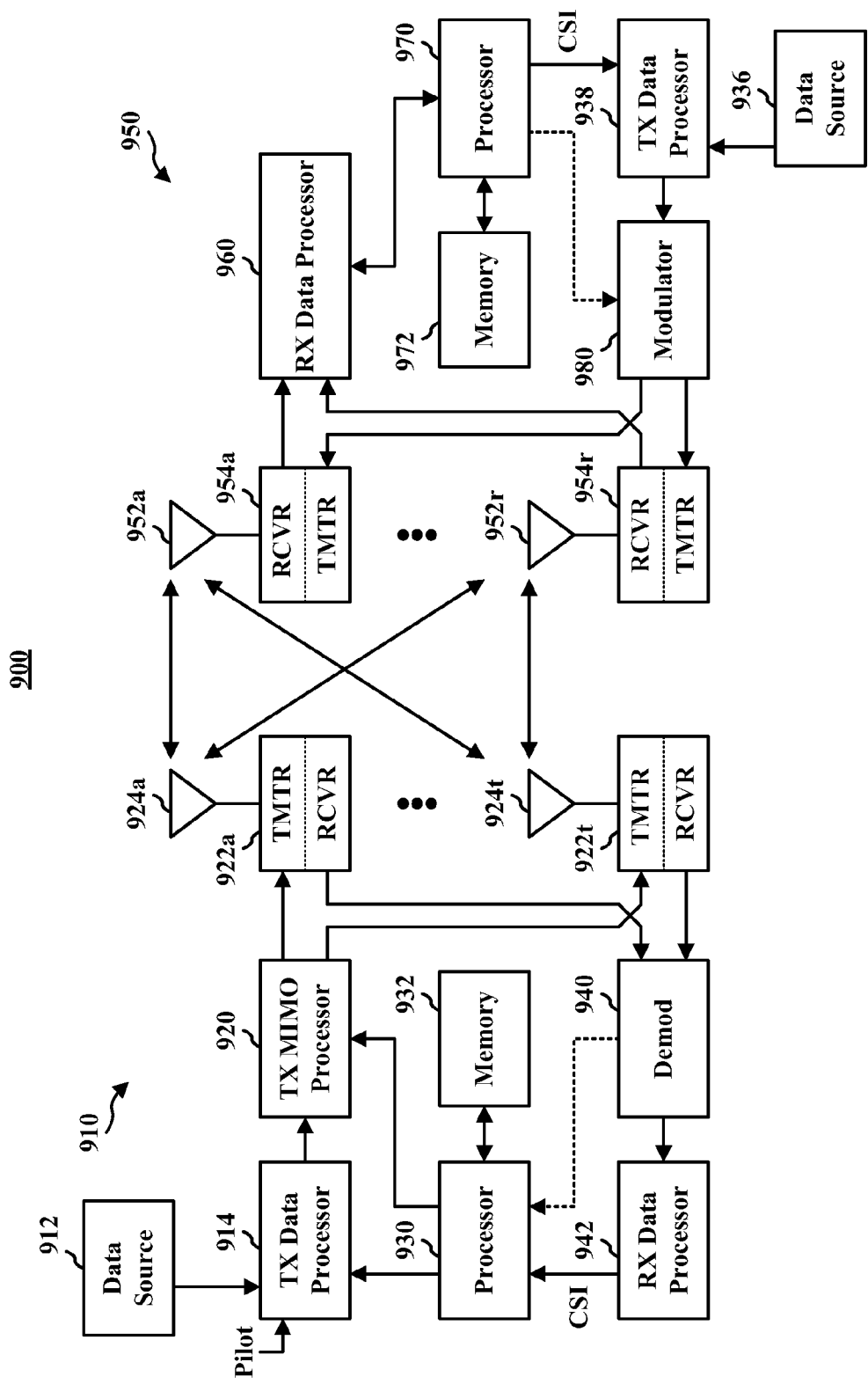
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4 and 7-8) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by NR antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
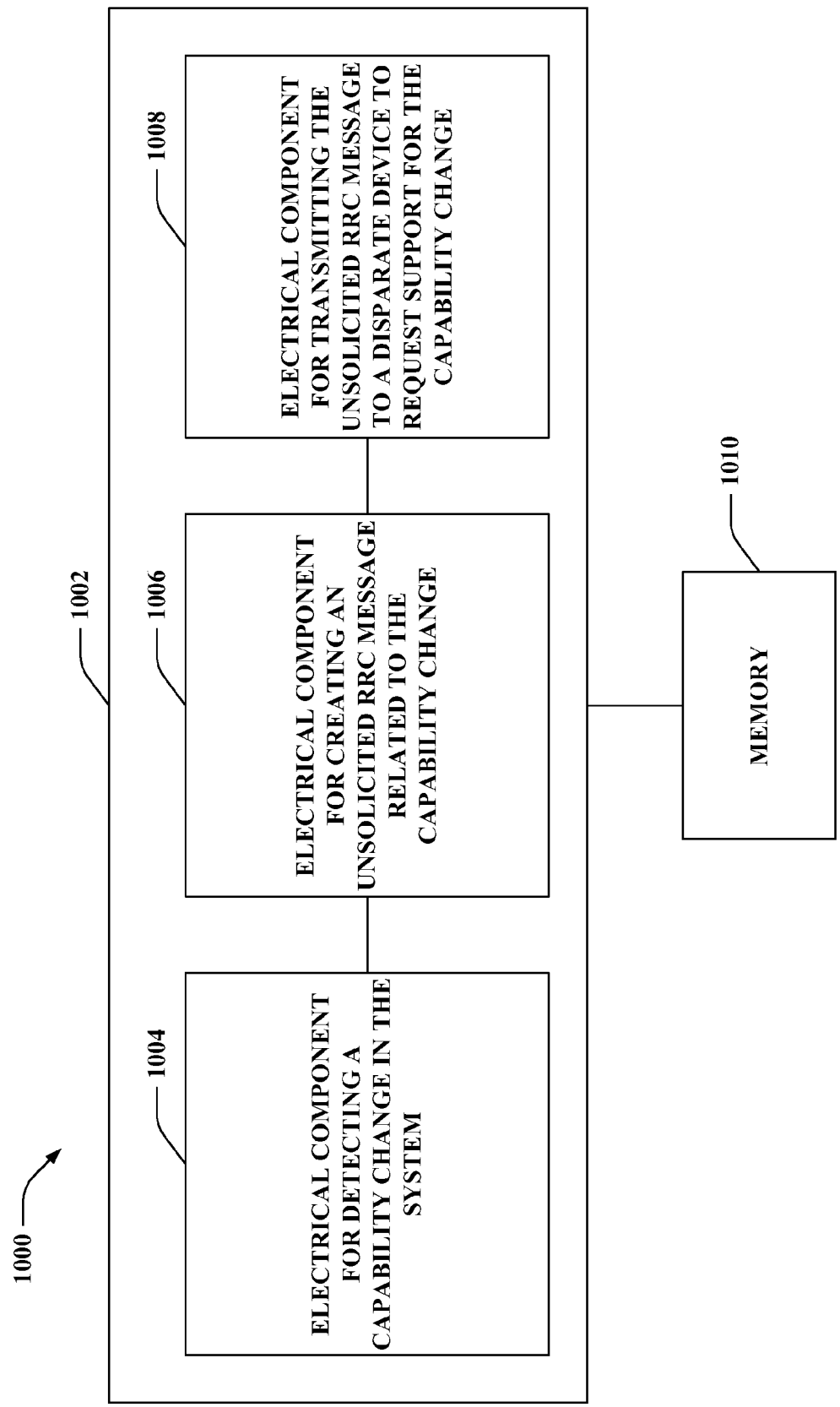
FIG. 10 is an illustration of an example system that transmits an unsolicited change in capability notification for an indication of support.

With reference to FIG. 10, illustrated is a system 1000 that transmits unsolicited notification of capability change in a wireless network. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for detecting a capability change in the system 1004. For example, the system, which can be a wireless communications apparatus, can experience a change in functional capability via external device association/dissociation, change in a UI, etc. Further, logical grouping 1002 can comprise an electrical component for creating an unsolicited RRC message related to the capability change 1006. The RRC message can comprise information regarding the capability change; in one example, the message can also comprise a transaction identifier that allows association of a response message. Furthermore, logical grouping 1002 can include an electrical component for transmitting the unsolicited RRC message to a disparate device to request support for the capability change 1008. Thus, the disparate device is notified of the capability change via an unsolicited notification. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
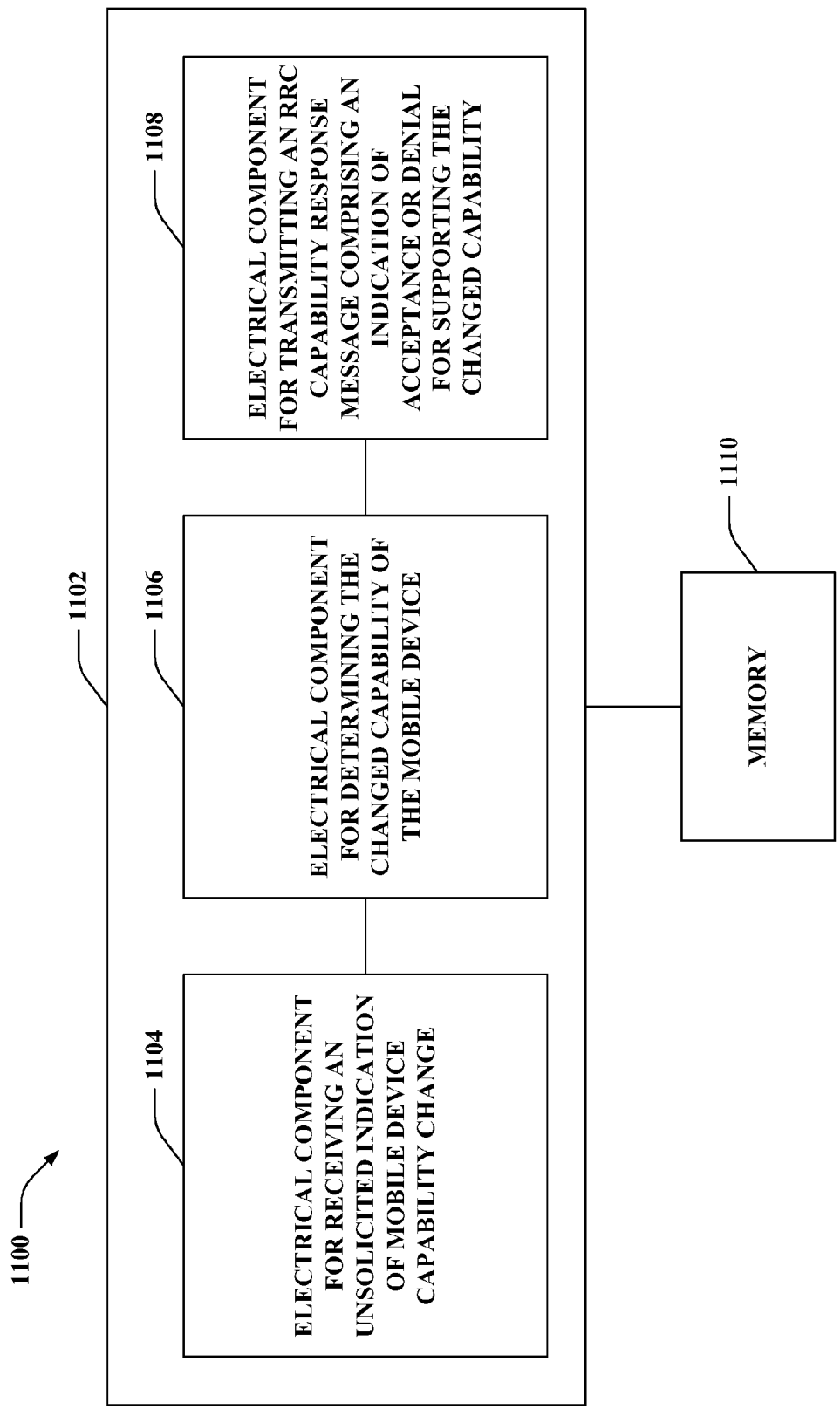
FIG. 11 is an illustration of an example system that determines a level of support for a received unsolicited capability change notification.

Turning to FIG. 11, illustrated is a system 1100 that receives an unsolicited indication of mobile device capability change and accordingly accommodates or denies the change. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate receiving and interpreting the capability change. Logical grouping 1102 can include an electrical component for receiving an unsolicited indication of mobile device capability change 1104. As described, this can be a new or existing RRC message transmitted upon the change occurrence rather than at reconnection and/or idle to active mode switch. Moreover, logical grouping 1102 can include an electrical component for determining the changed capability of the mobile device 1106. In this regard, requirements for modifying uplink parameters can be determined as well to support the capability change. Furthermore, logical grouping 1102 can include an electrical component for transmitting an RRC capability response message comprising an indication of acceptance or denial for supporting the changed capability 1108. Thus, the mobile device can determine whether the capability change is supported or not. In addition, the RRC capability response message, as described, can comprise modified uplink parameters, a transaction identifier, a timer for re-transmission, and/or the like. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for updating mobile device capabilities in wireless communication networks, comprising:
    determining a change in capability of a wireless device in an active mode;
    transmitting an unsolicited radio resource control connection re-establishment message indicating the change in capability, wherein the unsolicited radio resource control message is an existing message utilized to re-establish a connection with the wireless communication network when a mobile device switches from idle mode to active mode;
    receiving a radio resource control capability response message indicating acceptance or denial of the change in capability; and
    initializing a timer to restrict retransmitting the unsolicited radio resource control message based at least in part on the radio resource control capability response message indicating denial.

2. The method of claim 1, the radio resource control capability response message is an existing message utilized to reconfigure the wireless device upon the mode switch.

3. The method of claim 1, the unsolicited radio resource control connection re-establishment message comprises a transaction identifier to uniquely identify the message to the wireless device.

4. The method of claim 3, the radio resource control capability response message comprises a transaction identifier to associate the radio resource control capability response message to the unsolicited radio resource control connection re-establishment message.

5. The method of claim 1, further comprising modifying uplink communications parameters based at least in part on the acceptance or denial indication in the radio resource control capability response message.

6. The method of claim 1, the timer is initialized based at least in part on a timer value included in the radio resource control capability response message.

7. The method of claim 1, wherein the change in capability relates to a change in mode not being utilized, support for simultaneous services, internal resource conflicts, or attachment of external devices.

8. A wireless communications apparatus, comprising:
    at least one processor configured to:
    receive indication of capability change in the wireless communications apparatus in an active mode;
    generate a radio resource control connection re-establishment message indicating the capability change, wherein the radio resource control connection re-establishment message is an existing message utilized to re-establish a connection when a mobile device switches from idle mode to active mode;
    transmit the radio resource control connection re-establishment message without solicitation to an access point providing wireless network access to the wireless communications apparatus; and
    receive a radio resource control capability response message from the access point indicating acceptance or denial of the capability change, wherein the radio resource control capability response message indicates denial of the capability change and specifies a timer that restricts re-requesting the capability change; and
    a memory coupled to the at least one processor.

9. The wireless communications apparatus of claim 8, the radio resource control connection re-establishment message comprises a transaction identifier to differentiate the radio resource control message from disparate radio resource control messages.

10. The wireless communications apparatus of claim 9, the radio resource control capability response message comprises a transaction identifier to correspond with the radio resource control message.

11. The wireless communications apparatus of claim 8, the at least one processor further configured to reconfigure uplink parameters for subsequent communications based on the acceptance or denial.

12. The wireless communications apparatus of claim 8, the at least one processor further configured to transmit a radio resource control connection establishment message to the access point to initialize wireless network access.

13. A wireless communications apparatus, comprising:
    means for detecting a capability change in the wireless communications apparatus in an active mode;
    means for creating an unsolicited radio resource control connection re-establishment message related to the capability change, wherein the unsolicited radio resource control connection re-establishment message is an existing message utilized to re-establish a connection when a mobile device switches from idle mode to active mode; and
    means for transmitting the unsolicited radio resource control connection re-establishment message to a disparate device to request support for the capability change; and
    means for receiving a radio resource control capability response message from the disparate device in response to the radio resource control message, wherein the radio resource control capability response message indicates the capability change is denied and further comprises a timer before which the radio resource control message can be re-transmitted.

14. The wireless communications apparatus of claim 13, further comprising means for establishing communication with the disparate device to receive wireless network service.

15. The wireless communications apparatus of claim 13, the radio resource control capability response message specifies whether the capability change is accepted or denied.

16. The wireless communications apparatus of claim 13, the radio resource control capability response message comprises a transaction identifier associated with the radio resource control connection re-establishment message to relate the radio resource control capability response message to the radio resource control connection re-establishment message.

17. A computer program product, comprising:
a non-transitory computer-readable medium comprising:
code for causing at least one computer to determine a change in capability of a wireless device in an active mode;
code for causing the at least one computer to transmit an unsolicited radio resource control connection re-establishment message indicating the change in capability, wherein the unsolicited radio resource control connection re-establishment message is an existing message utilized to re-establish a connection when a mobile device switches from idle mode to active mode;
code for causing the at least one computer to receive a radio resource control capability response message indicating acceptance or denial of the change in capability; and
code for causing the at least one computer to initialize a timer to restrict retransmitting the unsolicited radio resource control message based at least in part on the radio resource control capability response message indicating denial.

18. A method for reconfiguring wireless uplink communication parameters based on changed wireless device capabilities, comprising:
receiving a radio resource control connection re-establishment message from a mobile device in an active mode indicating change in one or more capabilities, wherein the radio resource control connection re-establishment message is an existing message utilized to re-establish a connection when a mobile device switches from idle mode to active mode;
determining the one or more capabilities for which change is requested;
transmitting a radio resource control capability response message to the mobile device indicating denial or acceptance of the change; and
determining a timer that restricts re-transmission of a subsequent radio resource control message from the mobile device and including the timer in the radio resource control capability response message.

19. The method of claim 18, further comprising modifying uplink parameters for subsequent communications with the mobile device based at least in part on the change.

20. The method of claim 19, the radio resource control capability response message comprises indication of the modified uplink parameters.

21. The method of claim 18, further comprising including a transaction identifier in the radio resource control capability response message, the transaction identifier associated with the radio resource control message from the mobile device.

22. The method of claim 18, the radio resource control capability response message is an existing system message utilized to transmit reconfiguration parameters to the mobile device upon indication of the mobile device switching from idle to active mode.

23. A wireless communications apparatus, comprising:
at least one processor configured to:
receive an unsolicited indication of a capability change for a mobile device in an active mode and in communication with the wireless communications apparatus, wherein the unsolicited indication is a radio resource control connection re-establishment message utilized to re-establish a connection when a mobile device switches from idle mode to active mode;
determine the changed capability from the indication;
transmit a radio resource control capability response message to the mobile device accepting or denying the changed capability; and
deny the changed capability and include a timer that restricts re-transmission of a radio resource control message in the radio resource control capability response message; and
a memory coupled to the at least one processor.

24. The wireless communications apparatus of claim 23, the at least one processor further configured to accept the changed capability and accordingly modify uplink parameters to support the changed capability.

25. The wireless communications apparatus of claim 24, the radio resource control capability response message comprises notification of the modified uplink parameters.

26. The wireless communications apparatus of claim 25, the at least one processor further configured to receive subsequent mobile device communication that utilizes the modified uplink parameters.

27. The wireless communications apparatus of claim 23, the at least one processor further configured to generate the radio resource control capability response message comprising a transaction identifier to relate the radio resource control capability response message with the unsolicited indication of capability change.

28. A wireless communications apparatus for accommodating mobile device capability change in wireless communication networks, comprising:
means for receiving an unsolicited indication of a mobile device capability change from a mobile device in an active mode, wherein the unsolicited indication is a radio resource control connection re-establishment message utilized to re-establish a connection when a mobile device switches from idle mode to active mode;
means for determining the changed capability of the mobile device;
means for transmitting a radio resource control capability response message comprising an indication of acceptance or denial for supporting the changed capability; and
means for establishing a timer that restricts re-transmitting the unsolicited indication, wherein the timer is transmitted in the radio resource control capability response message along with a denial for supporting the changed capability.

29. The wireless communications apparatus of claim 28, further comprising means for changing uplink parameters based at least in part on the changed capability.

30. The wireless communications apparatus of claim 29, the radio resource control capability response message comprises the changed uplink parameters and acceptance for supporting the changed capability.

31. The wireless communications apparatus of claim 28, further comprising means for including a transaction identifier in the radio resource control capability response message, the transaction identifier is associated with the unsolicited indication of mobile device capability change.

32. A computer program product, comprising:
a non-transitory computer-readable medium comprising:
- code for causing at least one computer to receive a radio resource control connection re-establishment message from a mobile device in an active mode indicating change in one or more capabilities, wherein the radio resource control connection re-establishment message is an existing message utilized to re-establish a connection when a mobile device switches from idle mode to active mode;
- code for causing the at least one computer to determine the one or more capabilities for which change is requested;
- code for causing the at least one computer to transmit a radio resource control capability response message to the mobile device indicating denial or acceptance of the change; and
- code for causing the at least one computer to determine a timer that restricts re-transmission of a subsequent radio resource control message from the mobile device and include the timer in the radio resource control capability response message.

33. The computer program product of claim 32, the non-transitory computer-readable medium further comprising code for causing the at least one computer to modify uplink parameters for subsequent communications with the mobile device based at least in part on the change.

* * * * *